US012759328B2

(12) United States Patent
Praharaj et al.

(10) Patent No.: US 12,759,328 B2
(45) Date of Patent: Oct. 13, 2026

(54) SYSTEM AND METHOD FOR REDUCING CONDENSATION EFFECTS IN AN AQUEOUS INKJET PRINTER

(71) Applicant: Xerox Corporation, Norwalk, CT (US)

(72) Inventors: Seemit Praharaj, Webster, NY (US); Jason M. LeFevre, Penfield, NY (US); Palghat Ramesh, Pittsford, NY (US); Varun Sambhy, Pittsford, NY (US); Douglas K. Herrmann, Webster, NY (US); Anthony S. Condello, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 209 days.

(21) Appl. No.: 18/405,507

(22) Filed: Jan. 5, 2024

(65) Prior Publication Data

US 2025/0222707 A1 Jul. 10, 2025

(51) Int. Cl.
*B41J 29/02* (2006.01)

(52) U.S. Cl.
CPC .................................... *B41J 29/02* (2013.01)

(58) Field of Classification Search
CPC ................................ B41J 29/02; B41J 29/377
See application file for complete search history.

(56) References Cited

U.S. PATENT DOCUMENTS 9,441,362 B2 * 9/2016 Oppenheimer ........ G10K 11/16

FOREIGN PATENT DOCUMENTS

CN 106813525 A * 6/2017 ......... H05K 7/20336

OTHER PUBLICATIONS

English Translation for CN106813525A (Year: 2017).*

* cited by examiner

*Primary Examiner* — Kristal Feggins
*Assistant Examiner* — Tracey M Mcmillion
(74) *Attorney, Agent, or Firm* — Maginot Moore & Beck LLP

(57) ABSTRACT

An inkjet printer has a baffle that provides nucleation sites for condensation within the inkjet printer. The nucleation sites are recesses defined in a surface of each metal member of the baffle and are covered with a mesh material to prevent collected condensation from dripping onto printed sheets as the sheets pass through the inkjet printer.

20 Claims, 4 Drawing Sheets

SYSTEM AND METHOD FOR REDUCING CONDENSATION EFFECTS IN AN AQUEOUS INKJET PRINTER

TECHNICAL FIELD

This disclosure relates generally to inkjet printers that produce ink images on media, and more particularly, to condensation occurring in such printers.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content corresponding to images. The actuators in the printheads respond to the firing signals by expanding into an ink chamber to eject ink drops onto an image receiving surface and form an ink image that corresponds to the digital image content used to generate the firing signals. The image receiving surface is usually a continuous web of media material or a series of media sheets.

Inkjet printers used for producing color images typically include multiple printhead assemblies. Each printhead assembly includes one or more printheads that usually eject a single color of ink. In a typical inkjet color printer, four printhead assemblies are positioned in a process direction with each printhead assembly ejecting a different color of ink. The four ink colors most frequently used are cyan, magenta, yellow, and black. The common nomenclature for such printers is CMYK color printers. Some CMYK printers have two printhead assemblies that print each color of ink. The printhead assemblies that print the same color of ink are offset from each other by one-half of the distance between adjacent inkjets in the cross-process direction to double the number of pixels per inch density of a line of the color of ink ejected by the printheads in the two assemblies. As used in this document, the term "process direction" means the direction of movement of the image receiving surface as it passes the printheads in the printer and the term "cross-process direction" means a direction that is perpendicular to the process direction in the plane of the image receiving surface.

In these printers, image quality defects can be caused by condensation build-up at the entrance to the cooler module. This entrance is prone to the buildup of condensation because the transport into the cooler is immediately downstream of the dryer. The metal baffle that guides the media through the cooler module is typically at a temperature that is significantly lower than the dewpoint of the residual ink components remaining on the printed sheet after drying, especially when the image on the media has been printed with aqueous inks. When condensation occurs, it tends to collect on the stationary metal structure of the metal baffle, which is constructed of thin sheet metal strips and is located nearest the media coming into the cooler. This buildup of condensation typically occurs during extended length print jobs that run at high speeds on coated stocks and have higher than average overall ink area coverage. Over the course of the extended print job, a drop of liquid can form on the upper baffle of the media transport and drop onto the sheet. The liquid is absorbed by the media and causes an image quality (IQ) defect. Attenuating condensation at the entrance into a media cooler in an inkjet printer would be beneficial.

SUMMARY

A new color inkjet printer is configured with a baffle that attenuates the formation of condensation in the printer. The inkjet printer includes at least one baffle member defining a surface that is positioned opposite a portion of a media path through the inkjet printer, the surface defining at least one concave recess; and a mesh disposed over the at least one concave recess.

A new baffle attenuates the formation of condensation in an inkjet printer. The baffle includes at least one baffle member having a first end and a second end and a surface extending from the first end to the second end, the surface defining at least one concave recess; and a mesh disposed over the at least one concave recess in the at least one baffle member.

BRIEF DESCRIPTION OF THE DRAWINGS

The foregoing aspects and other features of a cooler in an color inkjet printer and baffle for reducing condensation in an inkjet printer are explained in the following description, taken in connection with the accompanying drawings.

DETAILED DESCRIPTION

Figure 1:
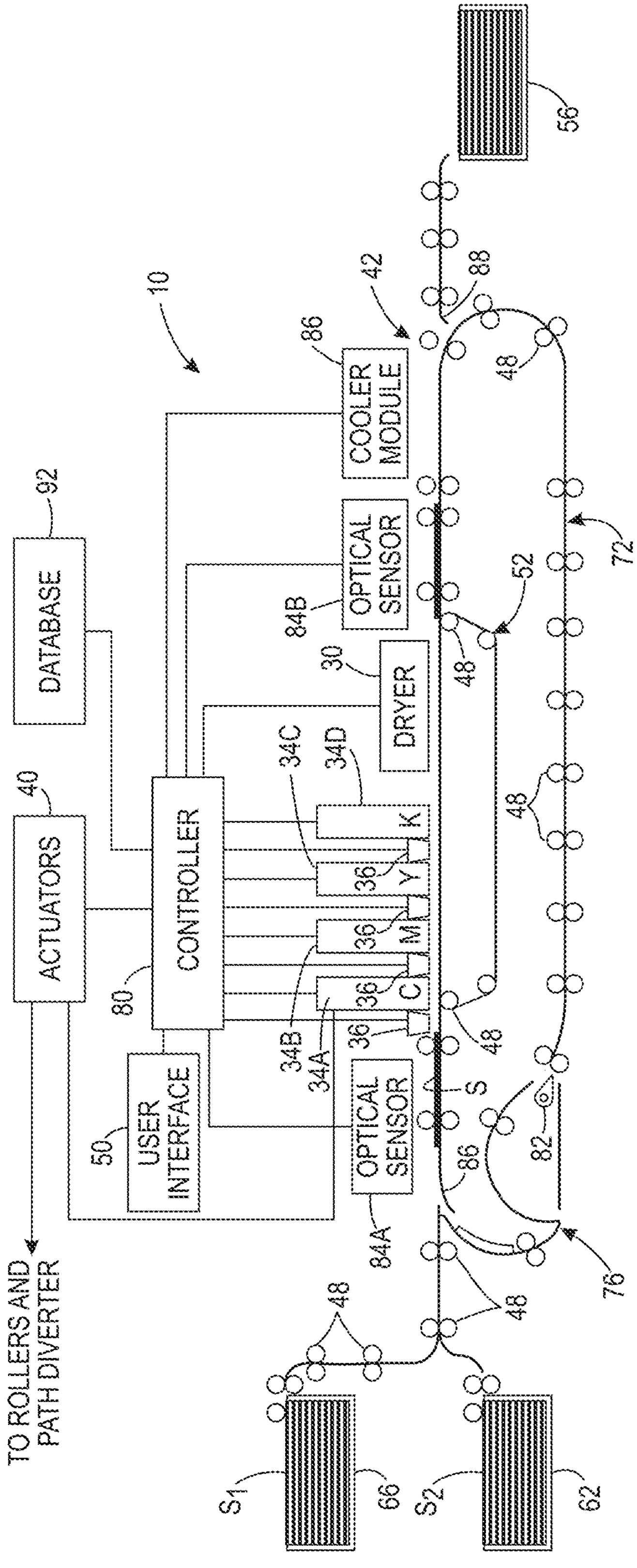
FIG. 1 is a schematic drawing of a color inkjet printer that is configured with nucleation sites that attenuate the effects of condensation on printed media sheets.

For a general understanding of the environment for the printer and cooler disclosed herein as well as the details for the printer and the cooler, reference is made to the drawings. In the drawings, like reference numerals have been used throughout to designate like elements. As used herein, the word "printer" encompasses any apparatus that ejects ink drops onto media to form ink images. The printer and baffle described below use baffle members that are configured to collect condensation without releasing the condensation onto printed media passing through the cooler.

FIG. 1 depicts a high-speed color inkjet printer 10 that is configured to dry fully or partially printed ink image on media sheets without expanding the footprint of the printer over previously known printers while increasing the dwell time of the printed sheets within the dryer. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to pulleys or to at least one driving pulley of conveyor 52 that comprises a portion of the media transport 42 that passes through the print zone PZ of the printer. As used in this document, the term "partial ink image" or "partially printed image" means an ink image on a media sheet that contains less than all of the color separations needed to print an ink image that corresponds to all of the ink image content data for an image. As used in this document, the term "print zone" means the portion of the media transport that is opposite any of the printhead assemblies in the printer.

The printer 10 is configured to perform print jobs sent to the printer by an external data source. As used in this document, the term "print job" means ink image content data for a series of ink images to be produced by a printer and the print job parameters at which the printer is operated to produce the ink images. The ink image content data is sent to the controller 80 from either an external data source, such as a scanning system or an online or work station connection. The ink image content data is processed to generate the inkjet ejector firing signals delivered to the printheads in the modules 34A-34D. Along with the ink image content data, the controller also receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, media manufacturer, and the like for executing a print job. As used in this document, the term "print job parameters" means non-image content data for performing a print job and the term "ink image content data" means digital data that identifies a color and a volume of each ejected ink drop that forms pixels in the ink images to be printed on the media sheets produced by a print job.

In one embodiment, each printhead module of the printer 10 has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads or a linear array of printheads that abut one another to enable media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

The media transport 42 includes a belt for moving print media, such as paper sheets, envelopes, or any other article suitable for receiving printed images, through the print zone so the printheads can eject ink drops onto the moving media to form printed images on the media. The belt has holes in it and the belt moves over a vacuum plenum within the conveyor 52 so a suction force can be generated through the surface of the belt. Each print medium engages a portion of the holes on the surface of the belt and the suction force holds the print medium to the surface of the belt to prevent the print media from slipping or otherwise moving relative to the surface of the belt as the belt moves through the printer. Holding each print medium in place relative to the surface of the moving belt enables the printer to control the timing of the operation of printheads to ensure that the printheads form printed images in proper locations on each print medium and ensures that the print media do not cause jams or other mechanical issues with the printer. In large-scale printer configurations, the belt often carries multiple print media simultaneously.

With continued reference to FIG. 1, a fully or partially printed media sheet enters into an image dryer 30 after the ink image is printed on a sheet S. As described in more detail below, the sheet lands on a shelf that moves vertically within the dryer, and then exits the dryer at the upper end of the dryer. The image dryer 30 can include an infrared heater, a heated air blower, air returns, or combinations of these components to heat the ink image and at least partially fix an image to the sheet. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A return path 72 is provided to receive a sheet from the media transport 42 after a substrate has been completely or partially printed and passed through the dryer 30. The sheet is moved by the rotation of pulleys in a direction opposite to the direction of movement in the process direction past the printheads. An actuator 40 operatively connected to pivot 88 is operated by the controller 80 to either block entry to the return path 72 and direct the media to the receptacle 56 or direct the media to the return path 72. At position 76, the substrates on the return path 72 can either be turned over so they can merge into the job stream being carried by the media transport 42 and the opposite side of the media sheet can be printed or left as they are so the printed side of the sheet can be printed again. To leave the sheets as they are, the controller 80 operates an actuator to turn pivot 82 counterclockwise to the position shown in the figure so the sheets bypass the bend in the return path and are directed to position 76 without being turned over. Thus, the printed side of the sheet can be printed. If the controller 80 operates the actuator to turn pivot 82 clockwise, then the sheet goes over the bend and is flipped before being returned to the transport path 42.

The printer 10 is configured with two optical sensors 84A and 84B. The optical sensor 84A that precedes the print zone in the process direction is used to generate image data of partially printed ink images returned to the media transport 42 for a second pass of the media sheet through the print zone for completion of the ink image. The optical sensor 84B that follows the dryer 30 in the process direction is used to generate image data of completely printed and partially printed ink images that have passed through the dryer. The controller is configured to process the image data from optical sensor 84B to determine whether the heater components in the dryer 30 need to be adjusted. The optical sensors 84A and 84B can be a digital camera, an array of LEDs and photodetectors, or other devices configured to generate image data of a passing surface.

As further shown in FIG. 1, the printed media sheets S not diverted to the return path 72 are carried by the media transport to the sheet receptacle 56 in which they are be collected. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, the dryer 30, and the optical sensors 84A and 84B. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image content data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in non-transitory, computer-readable memory associated with the processors or controllers. The processors, their memories, the instructions and data stored in the memories, and the interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, ink image content data for an ink image to be produced is sent to the controller 80 from either a scanning system or an online or work station connection. The ink image content data is processed to generate the inkjet ejector firing signals delivered to the printheads in the modules 34A-34D. Along with the ink image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer.

Figure 3A:
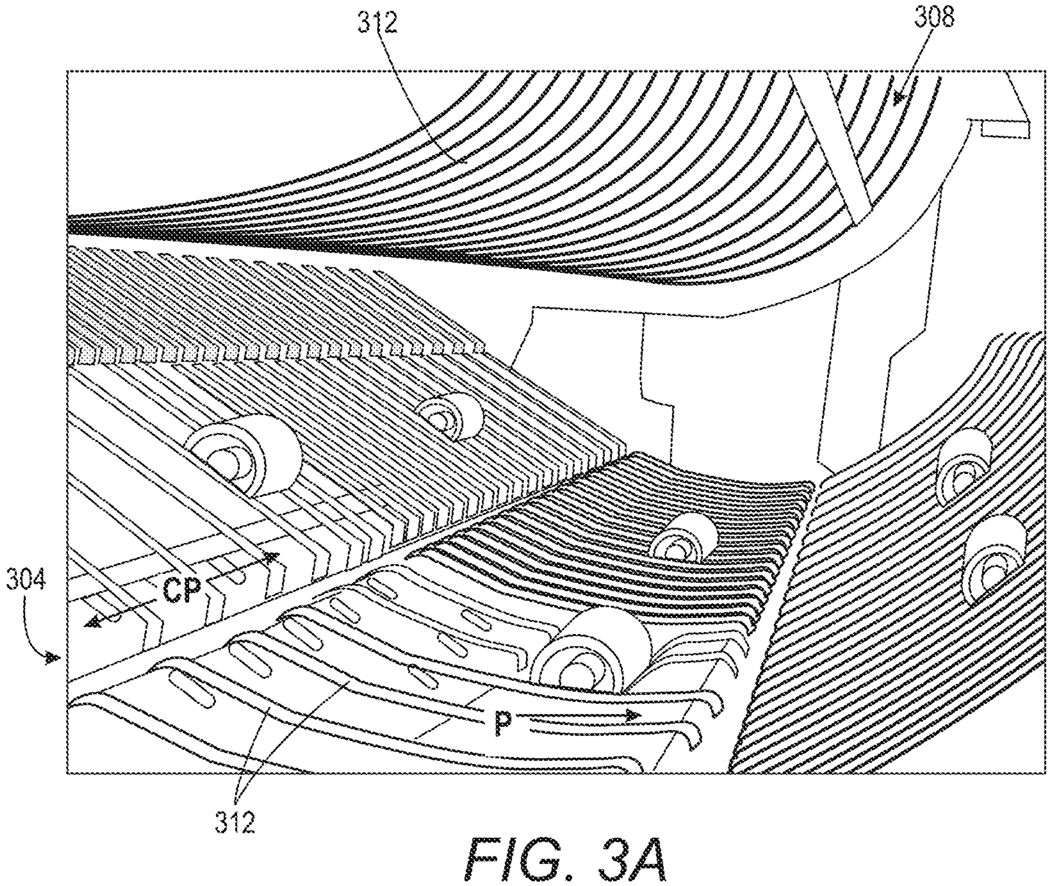
FIG. 3A PRIOR ART
FIG. 3A depicts upper and lower baffle members used in a prior art printer and FIG. 3B is a perspective view of the individual members in the baffle of FIG. 3A.

The cooler 86 includes blowers, fans, or refrigerant coils to cool the printed media sheets that were heated by the dryer 30 to fix at least partially the ink to the media sheets. The cooled media sheets are safer to handle than sheets that have not been cooled. Prior art coolers have a transport through them that include an upper baffle 308 and a lower baffle 304 as shown in FIG. 3A. As used in this document, the term "baffle" means a structure configured to maintain media sheets in position as the sheets move along a media transport path. The baffles shown in FIG. 3A are separated to enable damaged or stuck media sheets to be removed. When the sheets are removed, the baffles 304 and 308 are moved so a 5-10 mm gap exists between them for the passage of media sheets through the cooler. The baffles 304 and 308 include baffle members 312, which are sheet metal strips, made of stainless steel, for example, that are spaced from one another at a distance that enables a portion of the circumference of rollers driven by actuators to be exposed between the members and drive the media sheets through the cooler. The metal baffle members 312 in the upper baffle 308 provide sites for condensation to form and accumulate to form water or solvent drops that can drip onto the ink images on the printed media being cooled. Empirical analysis of condensates collected from baffles in an inkjet printer indicates a predominance of a co-solvent component of ink (1,2-butanediol). Condensation can occur when the baffle temperature is below the dew point of 1,2-butanediol. Typically, steady state baffle temperature is ~70° C. at nominal operating conditions. Other solvents that can condense at the nucleation sites include alcohol, glycol, and water.

Figure 3B:
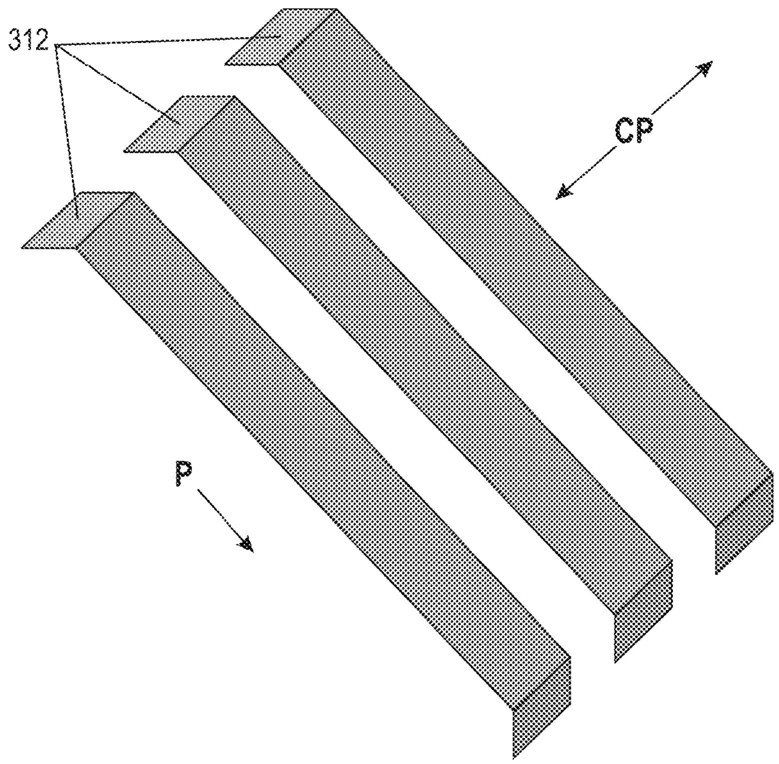
FIG. 3B PRIOR ART

Prior art baffle members 312 are shown in FIG. 3B. These members are solid planar metal members that are bent at each end at an obtuse angle to the center portion of each member for mounting the members to a baffle frame. The planar center portions keep the sheets from curling or otherwise being displaced within the cooler.

Figure 2:
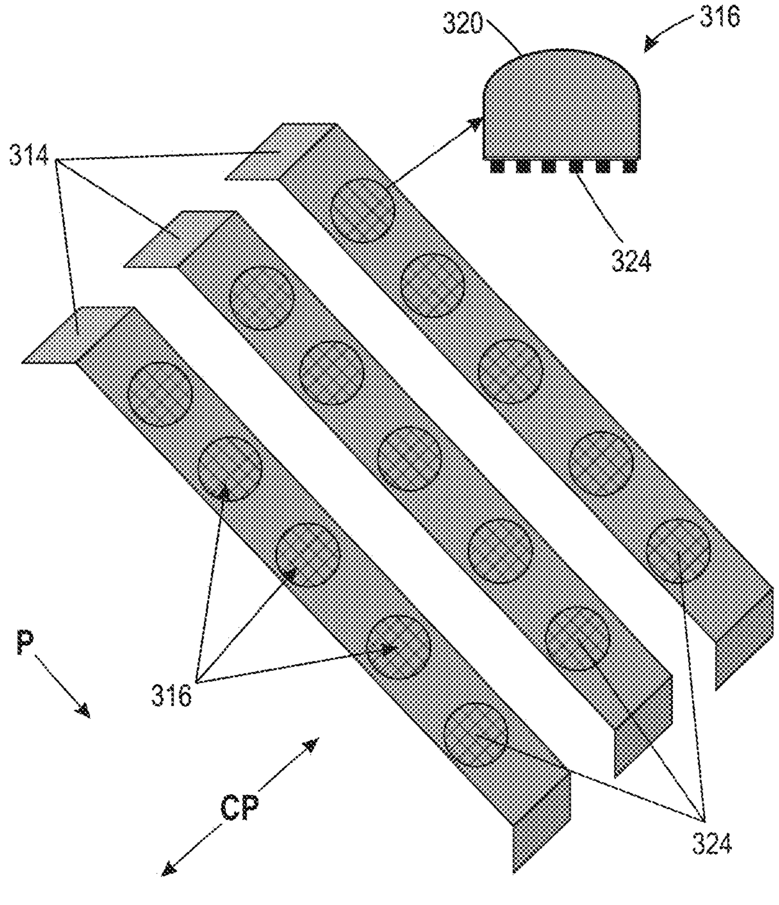
FIG. 2 is a perspective drawing of individual baffle members having nucleation sites used in the printer of FIG. 1.

To attenuate the likelihood of condensation collecting sufficiently to form drops of water or solvent that drip onto printed images, a new baffle member has been developed. The new baffle member 314 is shown in FIG. 2. The baffle member 314 extends in a direction parallel to the process direction P and a plurality of baffle members 314 are arranged parallel to one another in the cross-process direction CP. These baffle members are also metal strips made of stainless steel, for example, and include bent ends but they are configured with nucleation sites 320 that facilitate condensation within recesses 316 of the sites 320. As used in this document, the term "nucleation site" means structure configured to promote the formation of condensation and retain the condensation within the structure. This function is accomplished by forming the nucleation sites as recesses defined in a surface of a baffle member and the interior of the recesses are coated with a material having a higher specific heat capacity than the metal forming the baffle member, such as stainless steel. As the entire baffle member gets passively heated by heat transfer from the at least partially dried media entering the cooler, the recesses having the higher heat capacity reach a steady state temperature that is lower than the temperature of the steady state baffle temperature. The lower temperature within the recesses enable the recesses to serve as nucleation sites for co-solvent condensation. The specific heat capacity of stainless steel is typically ~0.5 J/g-° C., therefore the material choice for the coating the interior of recesses 316 can be aluminum alloys having a heat capacity of ~0.9 J/g-° C. Another material with higher heat capacity that could facilitate even faster condensation would be rubber with a heat capacity of ~1.8 J/g-° C.

As depicted in the cross-sectional view of a nucleation site 320 shown in FIG. 2, the recess 316 of the site 320 has a depth in a range of 0.2 to 1.0 cm from the surface of the metal member and is covered with a fine mesh of metal wires, such as stainless steel and the like. In some embodiments, the mesh material is within a mesh range #100 to #400, which means a linear inch of the material has 100 to 400 openings. This mesh helps prevent the condensate within a recess from dropping onto a media sheet. The recesses can be cleaned during a maintenance operation using a highly absorbent fibrous material, such as those made from cotton, flax, hemp, wool, and the like. Alternatively, the baffles and their recesses can be heated with an IR lamp during a maintenance operation to vaporize the accumulated condensates. In one embodiment, the metal members have a length in a range of 6 to 8 inches±one inch and the recesses are separated by a distance in a range of 0.5 to 1.5 inches±0.25 inches. The depth of the recesses and the separation distance between recesses depends upon the length of the metal members and their thicknesses.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An inkjet printer comprising:

at least one baffle member defining a surface that is positioned opposite a portion of a media path through the inkjet printer, the surface defining at least one concave recess; and a mesh disposed over the at least one concave recess between the at least one concave recess and the media path.

2. The inkjet printer of claim 1 wherein the at least one concave recess is coated with a material having a specific heat capacity that is greater than a specific heat capacity of a metal used to form the at least one baffle member.

3. The inkjet printer of claim 2 wherein the metal used to form the at least one baffle member is stainless steel and the material that coats the at least one concave recess is an aluminum alloy having a heat capacity of ~0.9 J/g-° C.

4. The inkjet printer of claim 2 wherein the metal used to form the at least one baffle member is stainless steel and the material that coats the at least one concave recess is rubber having a heat capacity of ~1.8 J/g-° C.

5. The inkjet printer of claim 2 wherein the mesh disposed over the at least one concave recess consists essentially of metal mesh.

6. The inkjet printer of claim 5 wherein the metal mesh covering the at least one concave recess has openings in a range of #100 to #400 mesh.

7. The inkjet printer of claim 6 wherein the at least one concave recess has a depth from the surface of the at least one baffle member in a range of 0.2 to 1.0 cm.

8. The inkjet printer of claim 7 wherein the at least one baffle member has a length from a first end to a second end of the at least one baffle member in a range of six to eight inches.

9. The inkjet printer of claim 8 wherein the at least one concave recess is separated by 0.5 to 1.5 inches from a second concave recess defined by the surface of the at least one baffle member.

10. The inkjet printer of claim 9, the at least one baffle member further comprising:

a first angled portion at the first end of the at least one baffle member; and a second angled portion at the second end of the at least one baffle member, the first angled portion and the second angled portion of each end being at an obtuse angle to a center portion of the at least one baffle member.

11. A baffle for an inkjet printer comprising:

at least one baffle member having a first end and a second end and a surface extending from the first end to the second end, the surface defining at least one concave recess configured to provide a nucleation site; and a mesh disposed over the at least one concave recess in the at least one baffle member and configured to obstruct condensate from dropping out of the nucleation site.

12. The baffle of claim 11 wherein an interior of the at least one concave recess is coated with a material having a specific heat capacity that is greater than a specific heat capacity of a metal used to form the at least one baffle member.

13. The baffle of claim 12 wherein the metal used to form the at least one baffle member is stainless steel and the material that coats the at least one concave recess is an aluminum alloy having a heat capacity of ~0.9 J/g-° C.

14. The baffle of claim 12 wherein the metal used to form the at least one baffle member is stainless steel and the material that coats the interior of the at least one concave recess is rubber having a heat capacity of ~1.8 J/g-° C.

15. The baffle of claim 12 wherein the mesh disposed over the at least one concave recess consists essentially of metal mesh.

16. The baffle of claim 15 wherein the mesh disposed over the at least one concave recess has openings in a range of #100 to #400 mesh.

17. The baffle of claim 16 wherein the at least one concave recess has a depth from the surface of the at least one baffle member in a range of 0.2 to 1.0 cm.

18. The baffle of claim 17 wherein the at least one baffle member has a length from the first end to the second end in a range of six to eight inches.

19. The baffle of claim 18 wherein the at least one concave recess is separated by 0.5 to 1.5 inches from a second concave recess in the at least one baffle member.

20. The baffle of claim 19, the at least one baffle member further comprising:

a first angled portion at the first end of the at least one baffle member; and a second angled portion at the second end of the at least one baffle member, the first angled portion and the second angled portion of each end being at an obtuse angle to a center portion of the at least one baffle member.

* * * * *